United States Patent [19]

Kato

[11] Patent Number: 4,620,895

[45] Date of Patent: Nov. 4, 1986

[54] APPARATUS FOR MANUFACTURING A SQUARE FILLER FOR WATER TREATMENT

[76] Inventor: Masashi Kato, No. 23, Miyahigashicho 1-chome,, Yokkaichi-shi, Mie-ken, Japan

[21] Appl. No.: 761,341

[22] Filed: Jul. 31, 1985

Related U.S. Application Data

[62] Division of Ser. No. 591,523, Mar. 20, 1984, abandoned.

[51] Int. Cl.⁴ .................... B32B 31/14; B32B 31/26
[52] U.S. Cl. .................................. 156/461; 156/204; 156/290; 156/308.4; 156/324; 156/553; 156/555; 264/145; 264/159; 264/160; 264/248; 425/383; 425/409
[58] Field of Search ............... 156/302, 290, 308.4, 156/309.6, 324, 461, 553, 555; 264/145, 159, 160, 248; 425/383, 409

[56] References Cited

U.S. PATENT DOCUMENTS

| | | | |
|---|---|---|---|
| 3,703,430 | 11/1972 | Rich | 156/553 |
| 3,785,897 | 1/1974 | Zipf | 156/204 |
| 3,791,266 | 2/1974 | Bucalo | 156/204 |
| 3,823,047 | 7/1974 | Colombo | 156/555 |
| 3,978,637 | 9/1976 | Mauriello | 156/555 |
| 4,082,598 | 4/1978 | Katagi | 156/204 |
| 4,184,946 | 1/1980 | Kato | 261/92 |
| 4,264,392 | 4/1981 | Watt | 156/290 |
| 4,376,671 | 3/1983 | Schulz | 156/553 |
| 4,417,936 | 11/1983 | Gaffney | 156/308.4 |

OTHER PUBLICATIONS

Terashima et al., "Performance of the Biofilm Reactor with Porous Tube Waterwheel Aerator and Fold Net Filters", 1984.

Primary Examiner—Ernest G. Therkorn
Attorney, Agent, or Firm—Wenderoth, Lind & Ponack

[57] ABSTRACT

A square filler for water treatment and an apparatus for the manufacture thereof are disclosed. The square filler is used as a contact medium for aerobic or anaerobic treatment of sewage.

The square filler is made of synthetic resin net sheet or net tube of which a plurality of net layers are formed, and melt-bonding is applied to at least one spot on each layer for fixing all layers together.

An apparatus for manufacturing square fillers flattens the net sheet or net tube for forming net layers with the application of pressure, intermittently feeds the flattened net sheet or net tube in the longitudinal axial direction thereof, and heats the net sheet or net tube for softening during transfer thereof.

The heated net sheet or net tube is locally pressed with projections for melt-bonding so that net layers are locally melt-bonded to each other, thereby square fillers having net layers fixed by solidification thereof are obtained.

2 Claims, 10 Drawing Figures

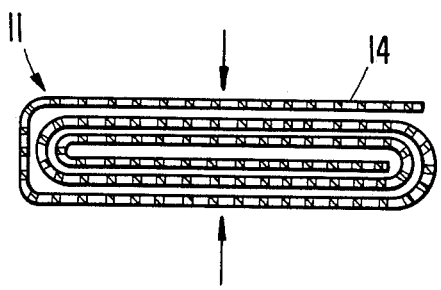
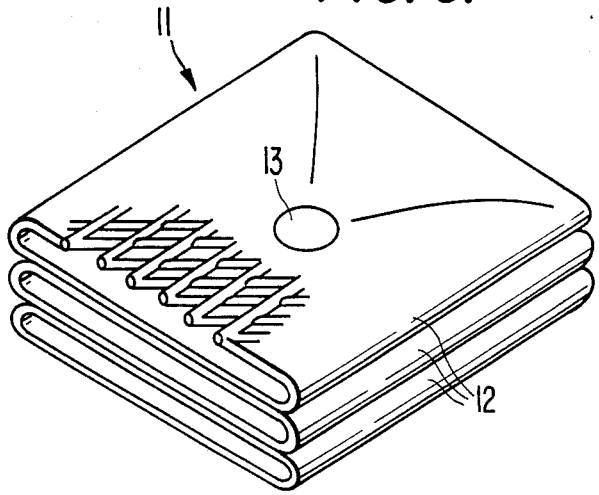
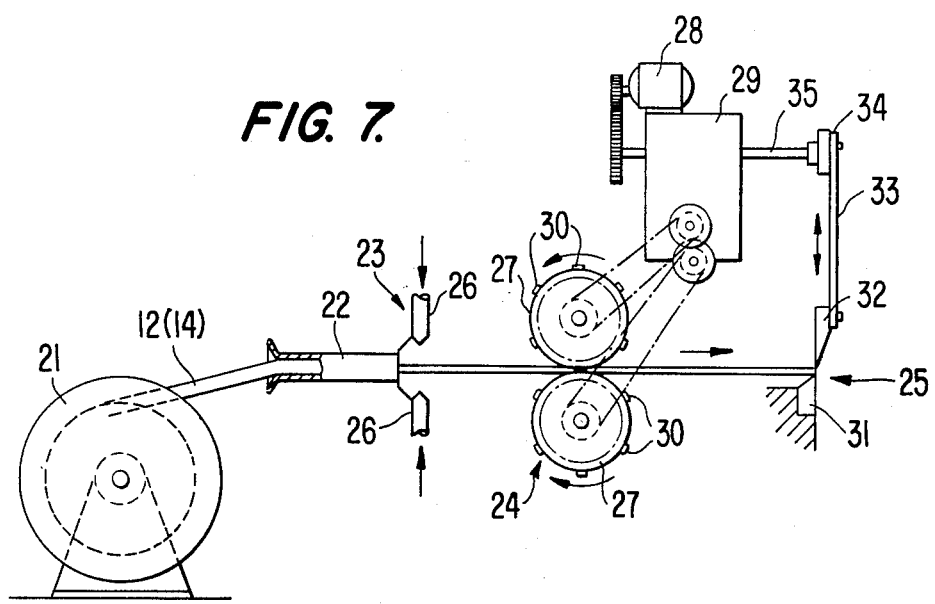
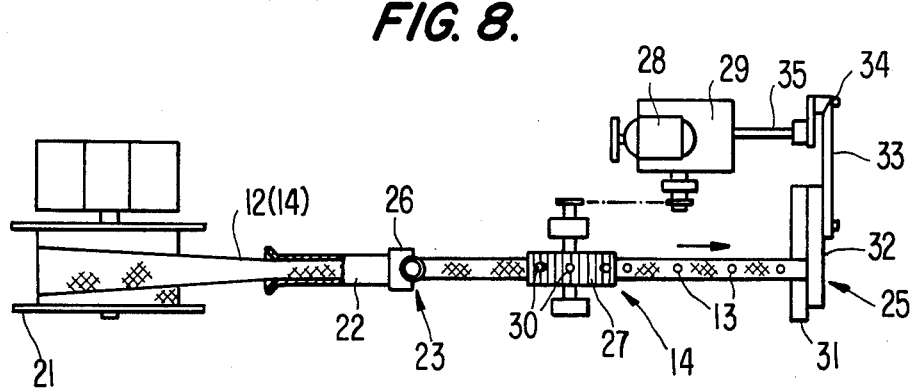

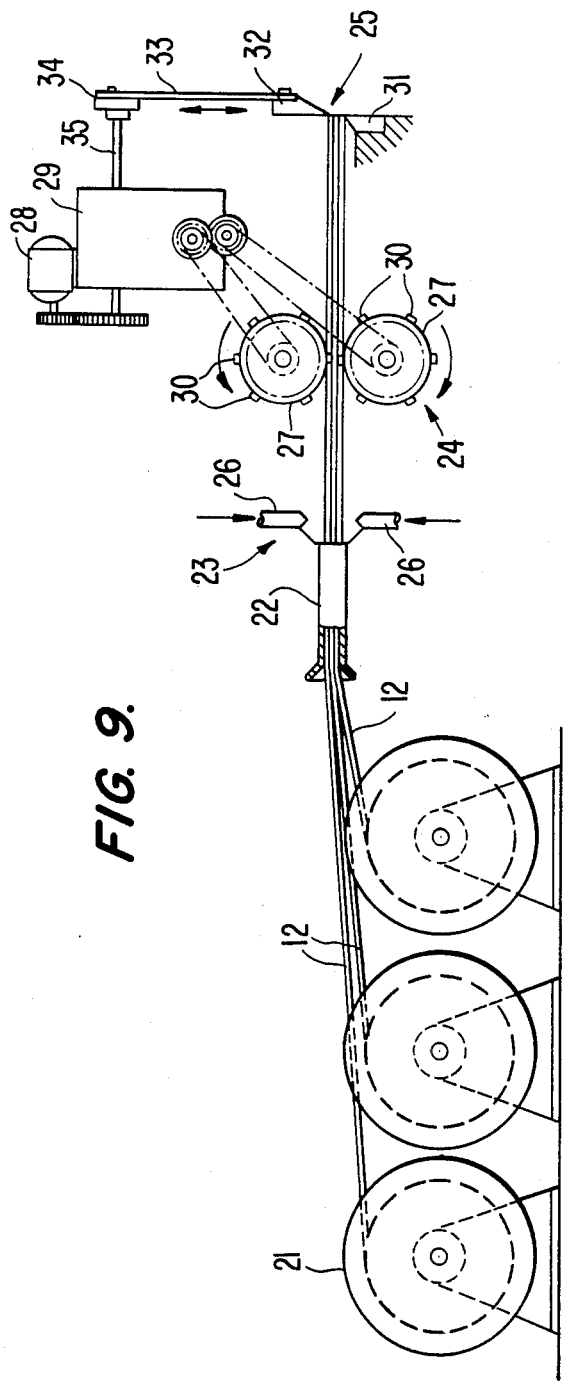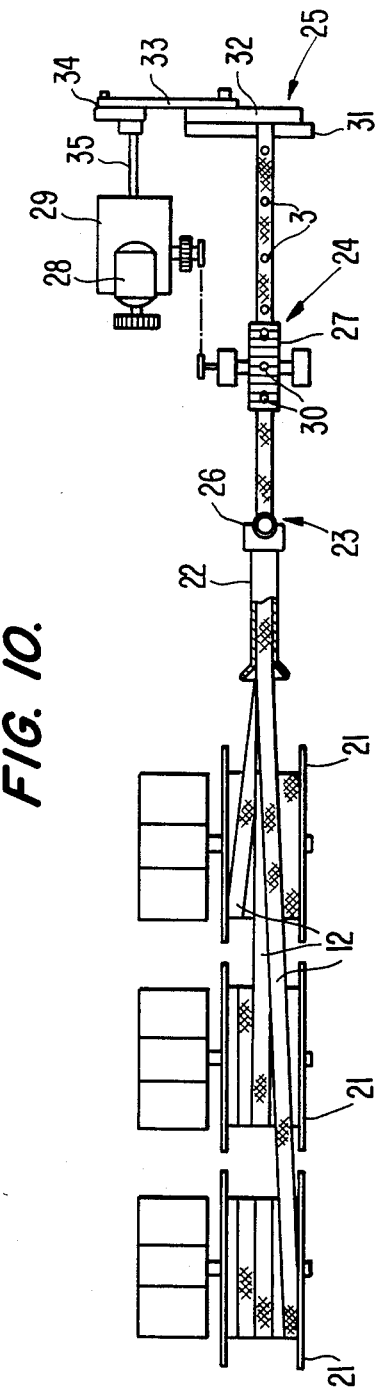

APPARATUS FOR MANUFACTURING A SQUARE FILLER FOR WATER TREATMENT

This application is a division of now abandoned application Ser. No. 591,523 filed Mar. 20, 1984.

BACKGROUND OF THE INVENTION

1. Field of the Invention

The present invention relates to a square filler for water treatment used mainly as a contact medium for aerobic or anaerobic treatment of sewage and to an apparatus for manufacturing such fillers.

2. Description of the Prior Art

Indispensable requirements for the filler as a contact medium for aerobic or anaerobic treatment of sewage performed in the vessel for sewage treatment are as follows:

(I) When viewed from the biological standpoint, it is desirable that such conditions as permitting the cycle of the food chain in the widest possible range continue in a limited water area and, at the same time, adapting coexistence of bacteria, protozoans, multicellular small animals, arthropods, mollusks, and vertebrates such as small fishes, as well as cleaning of treated water on a higher level (for example, treatment by denitrification and dephosphorylation) utilizing not only phytoplanktons but also duckweeds and various kinds of land grass or hydroponics of useful vegetables, to be prospective.

(II) Requirements from the user side are such that performance of water treatment is remarkably excellent and invariably stable, thereby enabling use of a small and inexpensive treating apparatus.

(III) The filler is light in weight and easy to handle, not requiring work but is used by simply being thrown into the vessel regardless of the shape and depth of the vessel.

(IV) The filler is preferably made of a chemically stable material and durable to permanent use in water.

(V) Fillers should possess an apparent specific gravity not different from that of water physically and geometrically, should neither sink nor float too high, should interwine with each other but not collect into one body, and are capable of suspending in water separately from each other.

(VI) Fillers must not induce an obstruction (clogging), caused by accumulated remains of dead organisms, to water flow passing through bodies thereof, must not confine bubbles therein, and must not rise beyond the water level.

Further, fillers are required to easily regain their initial state even if put under such unfavorable circumstances as above due to overload.

SUMMARY OF THE INVENTION

For meeting the above requirements, the inventor of the present invention has proposed a filler comprising a combination of a plurality of basic materials which are continuously extruded net tubes made of hard polyethylene plastics.

The filler of the present invention is most suitable for satisfying the above requirements. However, wide differences in price per unit volume, material cost, and productivity according to the structural combination of net tubes, cast an influential big problem on the practical use thereof.

An object of the present invention, accordingly, is to provide a square filler which is low in price per unit volume and capable of meeting the requirements for sewage treatment.

Another object of the present invention is to provide a square filler which is high in strength, provides optimum habitats for small animals, and is as large in relative volume as necessary to enable effective treatment of sewage in a limited water area.

Still another object of the present invention is to provide a square filler scarcely causing a decrease in habitats of small animals even if compressed or compacted during use.

A further object of the present invention is to provide a manufacturing apparatus capable of automatic mass-production of square fillers.

The above and other objects as well as features of the present invention will be understood in detail with reference to the appended drawings showing embodiments of the present invention and in consideration of the following description.

BRIEF DESCRIPTION OF THE INVENTION

FIG. 5 is a vertical sectional view of a fourth example;

FIG. 6 is a vertical sectional view of a fifth example;

FIG. 7 is a front elevational view of an apparatus for manufacturing square fillers referred to as the first example through the fourth one;

FIG. 8 is a plan view thereof;

FIG. 9 is a front elevation of an apparatus for manufacturing square fillers referred to as the fifth example; and FIG. 10 is a plan view thereof.

DESCRIPTION OF THE PREFERRED EMBODIMENTS

Each of square fillers shown in FIGS. 1 through 5 is of the basic structure that a net sheet or net tube is folded or rolled and flattened for forming layers, each having the width equal to a fraction of that of the sheet or tube in the initial state, each layer being melt-bonded to the other at, at least, one spot thereon.

Figure 1:
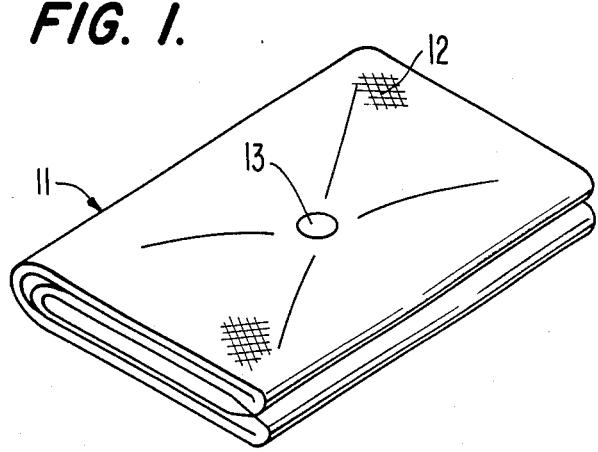
FIG. 1 is a perspective view of a first example of square filler according to the present invention.
Figure 2:
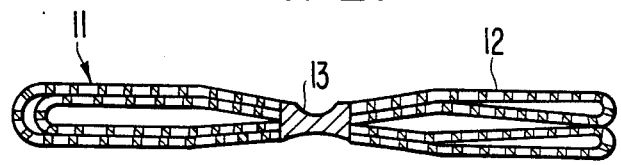
FIG. 2 is a vertical sectional view thereof.

The first example of a square filler 11 shown in FIGS. 1 and 2 is formed of a net tube 12 composed of fine wires of hard polyethylene plastic. These wires are cut in lengths of about 50 mm, pressed to be flat, folded to be halved in width, and melt-bonded at a spot 13 in the common center of layered parts thereof.

Figure 3:
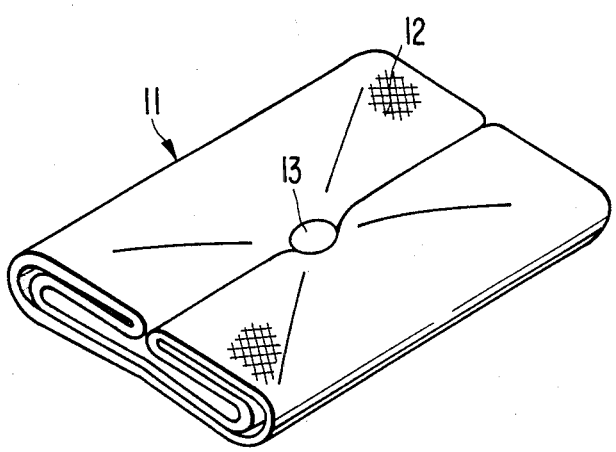
FIG. 3 is a perspective view of a second example.

The second example shown in FIG. 3 is formed of a net tube 12 which is similar to that used for the first example, flattened with both end portions folded to the same side so that both edges abut on each other and the width thereof is halved, and is subjected to melt-bonding at a spot 13 on the abutting edges.

Figure 4:
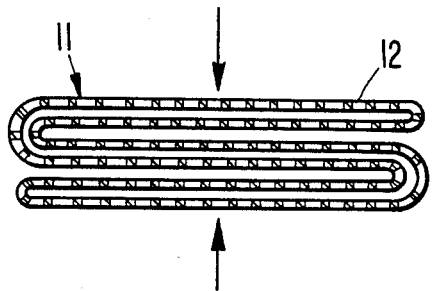
FIG. 4 is a vertical sectional view of a third example.

The third example shown in FIG. 4 is formed of a net tube 12 which is flattened, folded at both end portions to opposite sides so as to be composed in three layers and reduced to one-third of the initial width, and subjected to melt-bonding at layered parts.

The number of folds of the net tube is not limited by the examples shown in the drawings and, for example, a flattened net tube may be folded into four layers and melt-bonded at layered parts.

A net tube 12 preferably is produced according to, for example, a method disclosed in the Japanese Patent Publication No. 34-4185, formed of continuously extruded hard polyethylene resin (specific gravity ranging from 0.95 to 0.97), and having the diameter ranging from 20 to 200 mm, mesh pitch from 2 to 8 mm, and the diameter of net wire from 0.1 to 0.8 mm.

The fourth example shown in FIG. 5 is formed of a net sheet 14 which is comparatively large in width, rolled and flattened to be composed into layers, and melt-bonded at several spots on each of the layers.

A net sheet 14 used in the fourth example is identical with the net tube 12 in respect of mesh pitch and net wire diameter, in which the number of layers formed when the sheet is rolled is optional.

FIG. 7 and FIG. 8 show an apparatus for manufacturing square fillers. The apparatus is provided with a winding reel 21 for winding a long net sheet 14 or net tube 12 therearound, a guide member 22 for guiding and transferring the net sheet 14 or net tube 12 drawn from the winding reel 21 in the longitudinal direction thereof as well as for folding or rolling the net sheet 14 or net tube 12 passing therethrough so as to reduce the width of the sheet or tube to a fraction of the initial width, a heating mechanism 23 located ahead of the guide member 22 when viewed along the transfer direction of the net sheet 14 or net tube 12, an intermittent feed mechanism 24 disposed in front of the heating mechanism 23, and a cutter 25 disposed farther ahead of the feed mechanism 24.

The guide member 22 is provided with a folding or rolling part for shaping the cross section of the net sheet 14 or net tube 12 passing therethrough like that of the square filler 11 shown in FIGS. 1 through 5.

The heating mechanism 23 is equipped with nozzles 26 and disposed above and below the folded or rolled net sheet 14 or net tube 12 emerging from the guide member 22 so that net wires of the net sheet 14 or net tube 12 are heated to a temperature so high that melt-bonding of these wires is caused by hot air blown out from the nozzles 26.

The intermittent feed mechanism 24 is composed of a pair of feed rollers 27 disposed above and below the folded or rolled long net sheet 14 or net tube 12 and designed for flattening the net sheet 14 or net tube 12 with the application of pressure and intermittently feeding forward the long net sheet 14 or net tube 12 in a fixed distance with intermittent revolutions of feed rollers 27 actuated by an intermittent driving mechanism 29 provided with a motor 28.

The feed rollers 27, though not shown in detail, are endowed with some degrees of resilience roughly equal to each other by gravity or spring force, sized in width approximately equal to that of the flattened net sheet 14 or net tube 12, and each provided with projections and recesses like a toothed wheel throughout the outer periphery thereof for adding tension to that in the net sheet 14 or net tube 12.

Further, on the outer periphery of each of the feed rollers 27, melt-bonding projections 30 are provided at fixed circumferential intervals for pressing and melt-bonding net wires of the heated long net sheet 14 or net tube 12 to each other.

On each of feed rollers 27 shown in FIGS. 7 and 8, melt-bonding projections 30 are provided in positions determined by dividing the circumference of the roller into six equal parts and an angle produced by one intermittent turn of the roller 27 is equal to that defined by adjacent two projections 30, and, further, the feed rollers 27 are driven by the intermittent driving mechanism 29 so that a projection 30 on the upper roller 27 can positionally correspond to that on the lower roller 27 when stopped.

The cutter 25 is composed of a stationary cutting blade 31 and a shearing blade 32 both serving to clamp the flattened long net sheet 14 or net tube 12 from top and bottom and a crank 34 for imparting vertical movement to the shearing blade 32 through a link 33, whereby the crank 34 is driven through the revolving shaft 35 of the intermittent driving mechanism 29 and moves the shearing blade 32 up and down, while transfer of the net sheet 14 or net tube 12 is under suspension, for cutting a long piece of net sheet 14 or net tube 12 into small square pieces.

A distance between the heating mechanism 23 and the intermittent driving mechanism 24 is fixed to be equal to integral multiples of the circumferential distance between adjacent two projections 30 of each of feed rollers 27, and a position of the cutter 25 relative to the intermittent feed mechanism 24 is fixed so as to cut the long net sheet 14 or net tube 12 at a position between bonded spots 13 by means of the shearing blade 32 and the stationary blade 31.

Then, a method of manufacturing square fillers by the use of the abovesaid manufacturing apparatus will be described.

The long net sheet 14 or net tube 12 drawn from the winding reel 21 is inserted through the guide member 22 and, after being folded or rolled flat and reduced in width at the fraction of the initial width, is fed between the upper and the lower feed rollers 27.

The upper and the lower feed rollers 27 are intermittently driven at intervals equal to the pitch between melt-bonding projections 30 by the intermittent driving mechanism 29 and are fed the long net sheet 14 or net tube 12 intermittently in length equal to the abovesaid pitch.

The heating mechanism 23 heats net wires of the net sheet 14 or net tube 12 along the way of transfer to the feed rollers 27 by blowing hot air.

The long net sheet 14 or net tube 12, while passing through the guide member 22, is folded or rolled into a predetermined cross-sectional shape and then transferred to the heating mechanism 23, and a portion thereof facing the nozzles 26 of the heating mechanism 23 is heated more than the other portions when the transfer of the sheet 14 or tube 12 is suspended due to intermittent motion. The portion thus heated more than others lies in a position to which pressure is applied by melt-bonding projections 30 of the feed rollers 27 which turn several times. Therefore, every time that the feed rollers 27 stop, the more heated portion of the net sheet 14 or net tube 12 while clamped is subjected to melt-bonding by the projections 30 and, is at the same time, deprived of heat thereof by the projections 30, thereby being rapidly cooled to solidification and fixing layers of the net sheet 14 or net tube 12 into one body.

Thus, the fixed long net sheet 14 or net tube 12 with bonded spots is fed to the cutter 25 to be cut by the vertically moving shearing blade 32 and the stationary blade 31 and successively turned into pieces of square fillers 11 as shown in FIGS. 1 through 5.

By selective positioning of the cutter 25, melt-bonding can be applied to not only one spot in the center of the filler but also two half-spots each lying on one of the two abutting edges of the filler.

The fifth example of square filler shown in FIG. 6 is composed of three net tubes 12 which are stacked in layers and pressed flat so that longitudinal axes thereof are along the same direction, each layer being bonded to the other at a common bonded spot 13 provided by the application of heat and pressure thereto, and are cut into square pieces in such manner that the bonded spot 13 is positioned in the center of the cut piece.

The number of layers of the net tube is not limited by the example shown in the drawing.

An apparatus for manufacturing square fillers as the fifth example is shown in FIGS. 9 and 10 and is approximately identical to the other apparatus shown in FIGS. 7 and 8. Thus, the description thereof will be omitted except for differences between the two devices. Otherwise, like reference numerals apply to like parts.

As shown in FIGS. 9 and 10, a plurality of winding reels 21 each containing a long net tube 12 wound therearound are arranged in line with each other, and the net tubes 12 drawn from winding reels 21 are passed through the guide member 22 and guided lengthwise while layered. When the motor 28 is actuated after foremost ends of the long net tubes 12 drawn from the winding reels 21 are neatly collected and then feed between the upper and the lower feed rollers 27, these rollers 27 are driven through the intermittent driving mechanism 29 incorporating the cam and the Maltese cross. Each roller 27 makes an intermittent turn in the distance equal to a pitch between melt-bonding projections 30 thereof so as to intermittently feed the long net tubes 12 in the distance equal to the circumferential distance produced by one intermittent turn of the feed roller 27.

The heating mechanism 26 blows out hot air for heating net wires of the long net tubes 12 moving toward the feed rollers 27.

Because of the intermittent movement of long net tubes 12, a portion of a bundle of tubes facing the nozzles 26 is heated more than others when the transfer of tubes 12 is suspended. Since the more heated portion lies in a position to which pressure is applied by melt-bonding projections 30 of feed rollers 27 which repeat intermittent turns several times, every time that the feed rollers 27 stop, the more heated portion of a bundle of long tubes 12 is subjected to melt-bonding by melt-bonding projections 30. At the same time, deprived of heat thereof by these projections 30, the less heated portion of the bundle of long net tubes 12 is rapidly cooled to solidification and the layers of long tubes 12 are fixed into one body.

Thus, the fixed long net tubes 12 with bonded spots are fed to the cutter 25 to be cut by the vertically moving shearing blade 32 and the stationary blade 31 and successively turned into pieces of square fillers 11 as shown in FIG. 6.

What is claimed is:

1. An apparatus for manufacturing square fillers for water treatment comprising:
   at least one reel means for unwinding one of a synthetic resin net sheet and a synthetic resin net tube;
   means, positioned behind the at least one reel means in the longitudinal direction of the apparatus, for guiding and folding one of the net sheet and the net tube from the reel means in a substantially straight longitudinal direction;
   means, positioned behind the guiding means in the longitudinal direction, for heating at least central portions of one of the net sheet and the net tube passing therethrough from the guiding means;
   roller means, positioned behind the heating means in the longitudinal direction, for intermittently feeding and flattening with the application of pressure said one of the net sheet and the net tube into layers;
   a plurality of projection means, mounted in spaced relationship from each other on the circumferential periphery of the roller means, for pressing and melt-bonding heated central portions of said layers of said one of the net sheet and the net tube;
   means, connected to the roller means, for intermittently driving said roller means; and
   means, positioned behind the roller means in the longitudinal direction, for cutting the melt-bonded layers of said one of the net sheet and the net tube into predetermined short lengths of one of folded and rolled square fillers, respectively, for water treatment.

2. The apparatus according to claim 1 wherein:
   said at least one reel means includes a plurality of reel means for feeding a plurality of net tubes together in the longitudinal direction of the apparatus.

* * * * *